US010312830B2

(12) United States Patent
Post et al.

(10) Patent No.: US 10,312,830 B2
(45) Date of Patent: Jun. 4, 2019

(54) ELECTROSTATIC GENERATOR/MOTOR ROTOR ELECTRODE SYSTEM SUITABLE FOR INSTALLATION ON THE OUTER SURFACE OF AN EMB ROTOR

(71) Applicant: Lawrence Livermore National Security, LLC, Livermore, CA (US)

(72) Inventors: Richard F Post, Walnut Creek, CA (US); Lisle B. Hagler, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 316 days.

(21) Appl. No.: 15/156,280

(22) Filed: May 16, 2016

(65) Prior Publication Data

US 2017/0054385 A1    Feb. 23, 2017

Related U.S. Application Data

(60) Provisional application No. 62/207,353, filed on Aug. 19, 2015.

(51) Int. Cl.
*H02N 1/08* (2006.01)
*H02N 2/10* (2006.01)
*H02N 1/00* (2006.01)

(52) U.S. Cl.
CPC ..................... *H02N 1/08* (2013.01)

(58) Field of Classification Search
CPC ............ H02N 1/08; H02N 1/00; H02N 1/002; H02N 2/10; H02N 2/00
See application file for complete search history.

(56) References Cited

U.S. PATENT DOCUMENTS

| 2,542,494 | A | * | 2/1951 | Felici | H02N 1/08 310/309 |
| 3,094,653 | A | * | 6/1963 | Le May | H02N 1/08 310/309 |
| 5,054,593 | A | * | 10/1991 | Carlson | F16D 37/008 188/267.1 |
| 7,137,496 | B2 | | 11/2006 | Sheng et al. | |
| 7,834,513 | B2 | | 11/2010 | Post | |
| 9,270,203 | B2 | * | 2/2016 | Post | H02N 1/00 |

(Continued)

FOREIGN PATENT DOCUMENTS

| DE | 4035750 A1 * | 6/1991 | ............... H02N 1/08 |
| JP | 02237478 A * | 9/1990 | |

(Continued)

OTHER PUBLICATIONS

International Search Report and Written Opinion for PCT/US16/45493, corresponding to U.S. Appl. No. 15/156,280, 13 pages.

*Primary Examiner* — Edgardo San Martin
(74) *Attorney, Agent, or Firm* — John P. Wooldridge

(57) ABSTRACT

Electrostatic generator electrodes mounted on the outer surface of a fiber-composite rotor. The conducting strips are mounted with a slight tilt in angle such that the electrodes will experience no tension or compression effects as the rotor spins up or slows down. The compression would come about from effects associated with the Poisson Ratio. This change can eliminate any metal fatigue or loss of bonding that might have arisen if the electrodes were to be aligned with the axis.

19 Claims, 5 Drawing Sheets

(56) References Cited

U.S. PATENT DOCUMENTS

| | | | |
|---|---|---|---|
| 9,362,849 B2* | 6/2016 | Okada | H02N 1/08 |
| 2011/0084566 A1 | 4/2011 | Nakamura | |
| 2017/0054384 A1* | 2/2017 | Post | H02N 1/00 |
| 2017/0054386 A1* | 2/2017 | Post | H02N 1/08 |

FOREIGN PATENT DOCUMENTS

| | | | |
|---|---|---|---|
| JP | 04-145871 | | 5/1992 |
| JP | 04145871 A | * | 5/1992 |
| JP | 05022965 A | * | 1/1993 |
| JP | 08-009661 | | 1/1996 |
| JP | 2001-128469 | | 5/2001 |

* cited by examiner

ELECTROSTATIC GENERATOR/MOTOR ROTOR ELECTRODE SYSTEM SUITABLE FOR INSTALLATION ON THE OUTER SURFACE OF AN EMB ROTOR

CROSS-REFERENCE TO RELATED APPLICATIONS

This application claims the benefit of U.S. Provisional Patent Application No. 62/207,353 titled "Electrostatic Generator/Motor Rotor Electrode System Suitable for Installation on the Outer Surface of an EMB Rotor," filed Aug. 19, 2015, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation a Lawrence Livermore National Laboratory.

BACKGROUND OF THE INVENTION

Field of the Invention

The present invention relates to devices generally referred to as the electrostatic generator/motor, and more specifically, it relates to rotor electrode configurations for such devices.

Description of Related Art

In the design of an Electro-Mechanical Battery (EMB) using an electrostatic generator/motor and a fiber composite rotor, on the inner surface of which are mounted magnetic bearing elements, it would be highly advantageous to be able to locate the E-S generator rotor elements on the outside of the rotor. However, in order to insure the reliability and durability of these electrodes for decades-long operation of the EMB, it is essential to take into account the effects accompanying the high centrifugal forces to which the rotor is exposed. In a typical high-performance rotor, the centrifugal radial acceleration force is of order 200,000 g. As a result of that force, the outer radius of the rotor will expand of order 2 to 3 centimeters, and, as predicted by the value of the Poisson Ratio for the composite, it will contract in axial length by a comparable amount. An electrode configuration that solves the problems arising from this circumstance through the effect of its geometric design is desirable.

SUMMARY OF THE INVENTION

An embodiment of the invention pertains to the geometric design of foil-based E-S generator electrodes mounted on the outer surface of a fiber-composite rotor. These electrodes, if they are aligned with the axis, would be subject to geometric distortion (e.g., axial compression) that could lead to failure from metal fatigue or failure of their adhesive bonding. The compression would come about from effects associated with the Poisson Ratio. This constant, of order 0.2 for a fiber composite, describes the axial compression that must accompany the circumferential expansion coming from centrifugal forces. It is shown herein that if the foil conducting strips are mounted with a slight tilt in angle, the electrodes will experience no axial contraction or expansion effects as the rotor spins up or slows down. This change can eliminate any buckling or loss of bonding that might have arisen if the electrodes were to be aligned with the axis.

DETAILED DESCRIPTION OF THE INVENTION

An embodiment of the present invention provides an electrode design that addresses the problems associated with the Poisson Ratio expansions and contractions that will occur at the outer surface of the rotor. The most serious problem that can arise comes from the axial contraction in length. Its effect would be to create a cyclic (once every charge/discharge cycle) axially directed compression of the foil, possibly leading to failure of the adhesive bond, or to rupture of the foil from metal fatigue, or to crinkling buckling) and straightening of its surface. Answers to this issue are described below.

The value of Poisson's ratio determines the ratio of the axial contraction of the rotor relative to its expansion in circumferential length. It follows that there must exist, on the surface of the rotor, helical lines for which there is neither expansion nor contraction in length. This helical angle can be calculated. If the foil strips are oriented with respect to the rotor axis by this angle, they will experience no axial contractions or expansions as the EMB rotor cycles its rotation speed while being charged or discharged. There will, however, remain tensional stresses that may exceed the elastic limit of the foil. One solution to this problem is to impose a thin layer of elastomeric material between the foil and the rotor body, bonding it with adhesive layers between the rotor body, the elastomer, and the foil. The elastomer then would relieve the stress alluded to above. Based on this disclosure, those skilled in the art will realize other means for reducing this stress. Further, based on this disclosure, those skilled in the art will realize that electrode configurations other than foils can be utilized.

A means to approach the problem is described below. It consists of using a detailed stress/strain analysis of the problem to find the tipping angle that eliminates the electrode's axial strain while at the same time subjecting the strips to acceptable tension levels, as relieved again by the use of an elastomeric backing layer. Note that the helical angle and the tipping angle are one and the same (see equation 1). When the electrodes are set at this angle they will experience no axial strain, but will be subjected to both transverse, axial and shear stress. The use of an elastomeric backing will keep these stresses to an acceptable level.

Figure 1A:
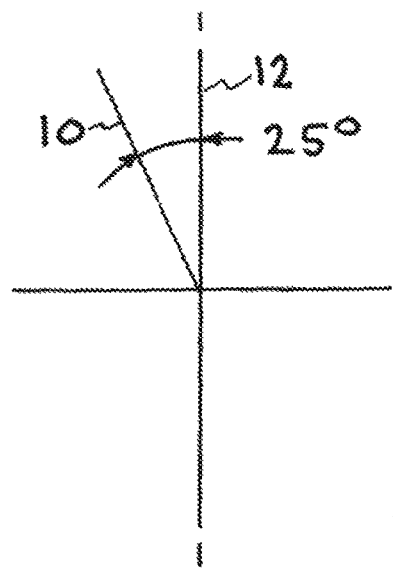
FIG. 1A illustrates a line 10 that is 25 degrees from the vertical axis 12.
Figure 1B:
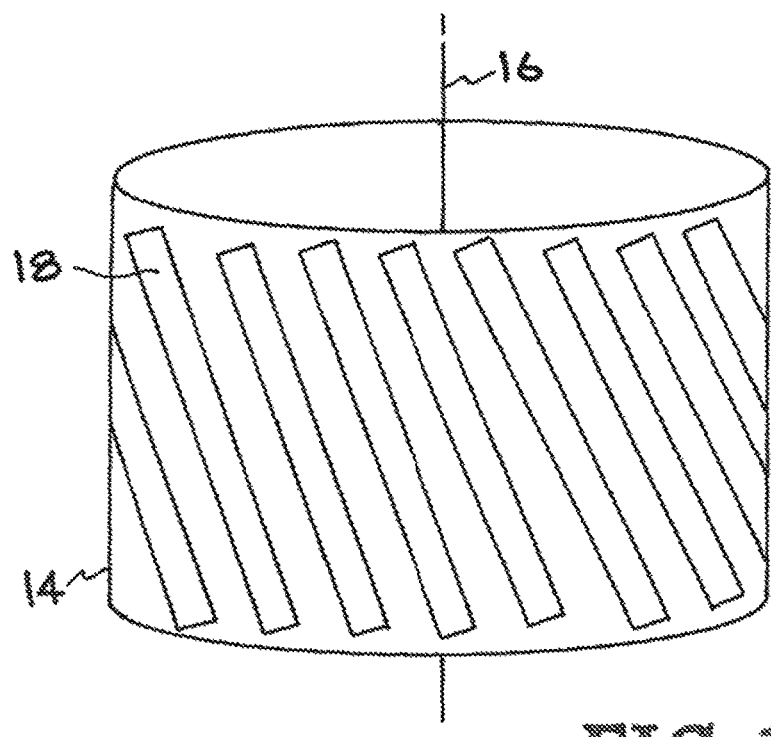
FIG. 1B shows a fiber composite rotor 14 that is centered on a rotational axis 16.

The analysis yields a value for the tipping angle given as follows:

$$\phi = \left(\frac{1}{2}\right)\cos^{-1}\left(\frac{1-\gamma}{1+\gamma}\right) \quad [1]$$

where γ is the Poisson Ratio of the composite. Taking the value 0.22 for the Poisson ratio (S-glass/epoxy composite), the tipping angle is 25°. FIG. 1A illustrates a line 10 that is 25 degrees from the vertical axis 12. FIG. 1B shows a fiber composite rotor 14 that is centered on a rotational axis 16. Foil electrodes 18 are adhered to the outside surface of the rotor and are placed at an angel of 25 degrees with respect to rotational axis 16.

Figure 2:
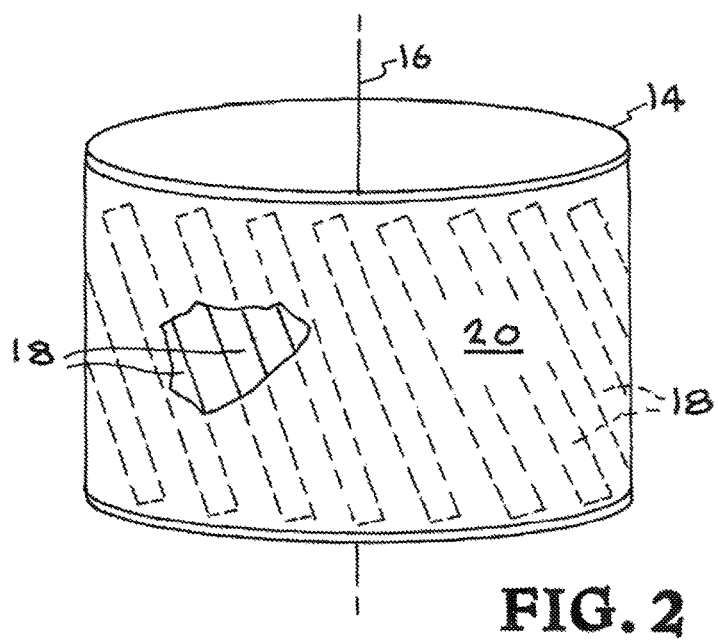
FIG. 2 shows a fiber composite rotor identical to that of FIG. 1B but with an additional thin cover 20 layer placed over the electrodes.

Thus far, this disclosure relates to means for eliminating either tension or compression forces on E-S generator/motor rotor electrodes (e.g., foil-based electrodes) located on the outer surface of a FW rotor. In one embodiment, these electrodes are held (with an adhesive) onto the non-conducting surface (e.g., glass or basalt) of a fiber composite rotor. If needed, a thin cover layer of the same fiber composite is placed over the electrodes. FIG. 2 shows a fiber composite rotor identical to that of FIG. 1B but with an additional thin cover 20 layer placed over the electrodes. By using the means described above it is possible to eliminate, or to at least reduce, crinkling or metal fatigue of the electrode material over the projected decades-long lifetime of the EMB.

Figure 3:
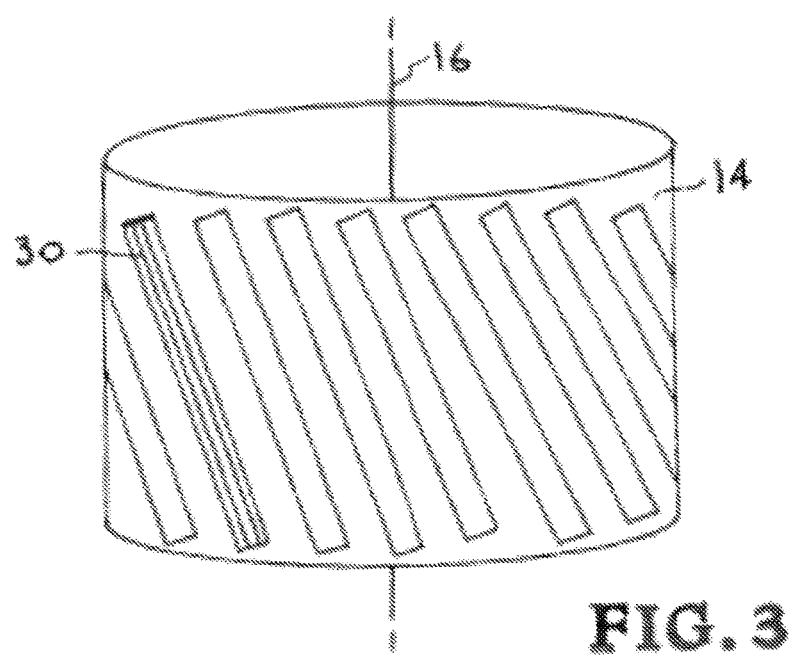
FIG. 3 shows a fiber composite rotor similar to that of FIG. 1B and illustrates a single electrode 30 formed from a planar stack of thin metal wires, connected electrically to each other at both ends of the stack.

Another way to resolve the problem just described would be to form the electrode from a planar stack of thin metal wires, connected electrically to each other at one or both ends of the stack. In this case the wires of the planar wire array would not be subjected to any significant transverse strain, but would simply separate laterally by an insignificant amount. FIG. 3 shows a fiber composite rotor similar to that of FIG. 1B. The figure illustrates a single electrode 30 formed from a planar stack of thin metal wires, connected electrically to each other at both ends of the stack. For comparison, the figure shows the foil type electrode described above; however, it is desirable that all of the electrodes in this embodiment are planar stacks of thin metal wires.

Figure 4A:
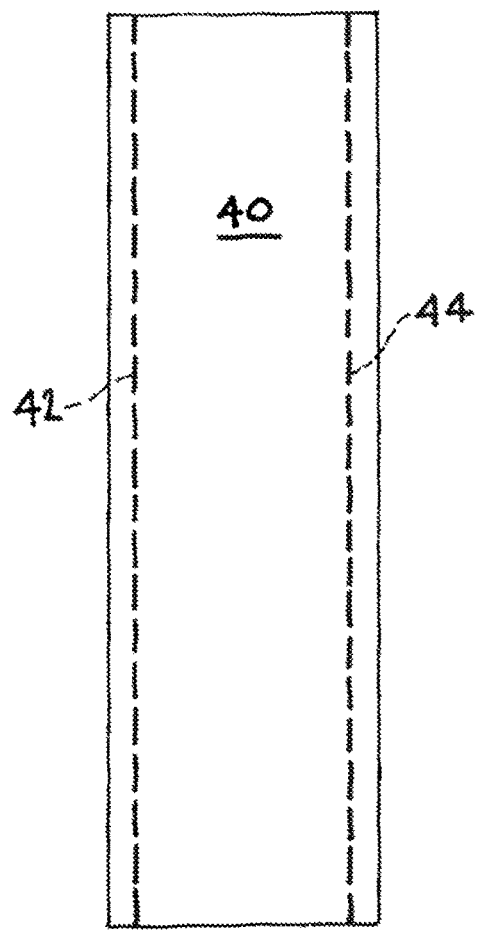
FIG. 4A shows a front view of a foil electrode 40 and includes two thin longitudinally oriented pieces of wire 42, 44 which are included in the folds to make more rounded edges.
Figure 4B:
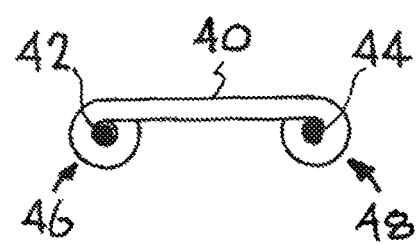
FIG. 4B shows an end view of the foil electrode 40 and the two thin longitudinally oriented pieces of wire 42, 44.

As discussed, an aspect of the rotor electrode configuration being considered here addresses the problem of restraining the electrodes from being torn from the surface of the rotor by the centrifugal force field. In one embodiment, the electrodes may be fabricated of aluminum foil strips. One embodiment of such strips, illustrated in FIGS. 4A and 4B, provides rounded edges made by folding a small width of the foil back on itself with the folded edge section being at the back. FIG. 4A shows a front view of a foil electrode 40 and includes two thin longitudinally oriented pieces of wire 42, 44 which are included in the folds to make more rounded edges. The wires are depicted as dashed lines because they are located behind the foil electrode 40. FIG. 4B shows an end view of the foil electrode 40 and the two thin longitudinally oriented pieces of wire 42, 44. Arrows 46 and 48 point to the curved part of the foil edges. This curvature increases the voltage required to create an arc between the rotor and stator electrodes. Parallel foil strips would then be laid down on the surface of the rotor, which would have been smoothed by machining. The strips would be held in place by an adhesive. If needed, the next step would be to filament wind the strips to the rotor with a thin layer (e.g., of order 0.25 mm. in thickness) of the same fiber composite that was used in filament winding the rotor. The thin foil will exert only a very small centrifugal force on this outer winding layer, thus should not compromise the rotor maximum operating speed.

The rotor electrodes as described above can be incorporated into a "balanced circuit" system (See FIG. 15 in U.S. Pat. No. 7,834,513, incorporated herein by reference). In using this circuit, the rotor electrodes operate in a "virtual ground" situation. That is, the stator is divided into an upper ("plus" charged) section and a lower ("minus" charged) section. See FIG. 5, described below. The E-S generator capacitor is thus divided into an upper and lower half, with the rotor electrodes, which run the full length of the rotor, completing the circuit. These electrodes could be made, as discussed for example, of vertical strips of metal foil bonded to the outer surface of the rotor cell structure. The positioning and angle of the stator electrode system can be made to match the periodicity and angle of the rotor electrodes, by incorporating an azimuthal gap between them with the same periodicity. To optimize the max/min capacity ratio, the gaps between the rotor conductor strips might be made wider than the width of the strips themselves.

Figure 5:
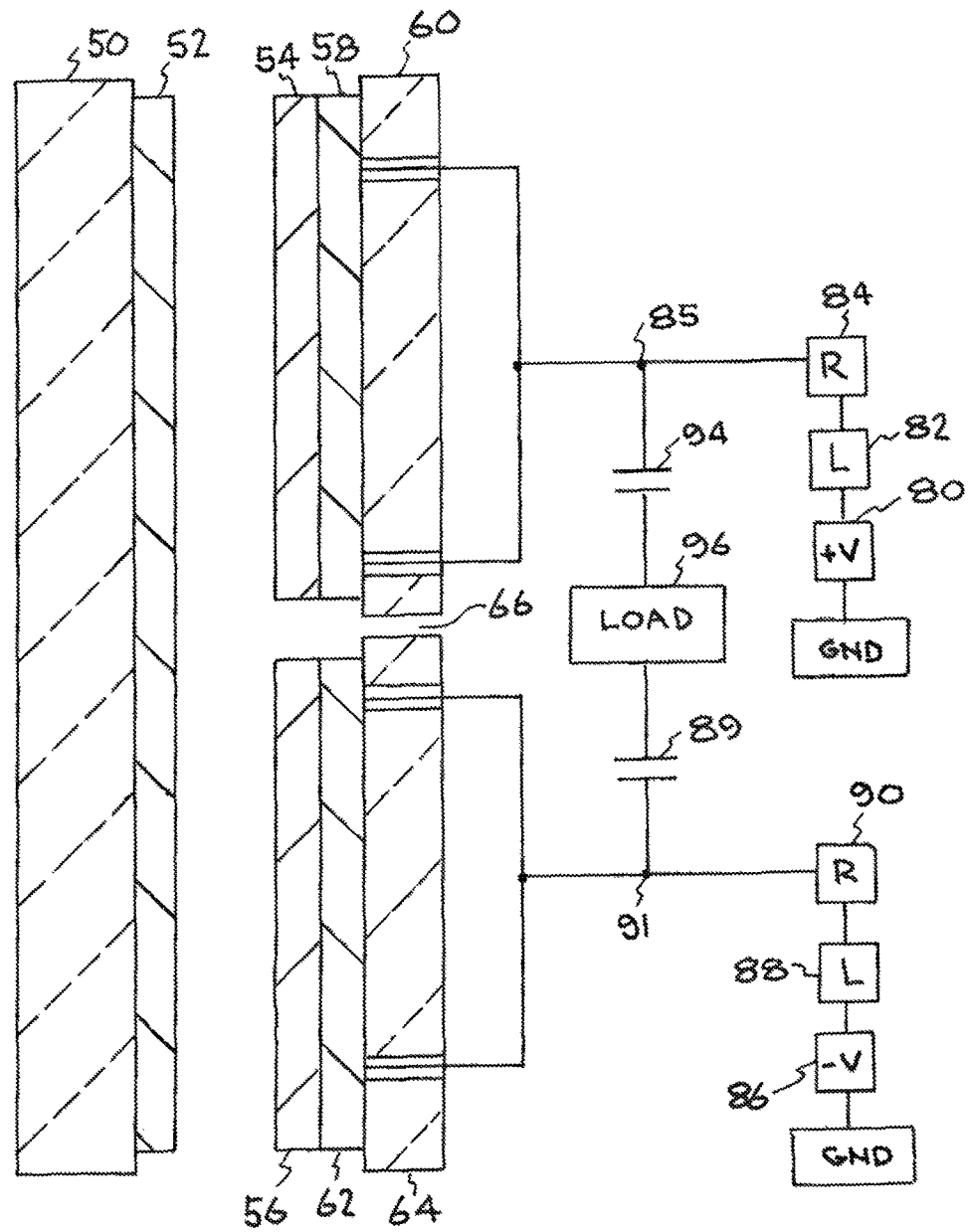
FIG. 5 shows a sectional view of one side of the rotor 50 which shows one electrode strip 52.

More specifically. FIG. 5 shows a sectional view of one side of the rotor 50 which shows one electrode strip 52. In this embodiment, the rotor is electrically non-conductive. The figure also shows an upper series of stator electrode blades 54 and a lower series of stator electrode blades 56. The upper series of blades 54 are in electrical contact with conductive strip 58. which is attached to stator electrode section 60. The lower series of blades 56 are in electrical contact with conductive strip 62, which is attached to stator electrode section 64. The gap between the rotor electrodes and the stator electrodes is exaggerated in the figure. Notice the gap 66 between stator section 60 and stator section 64. If the upper and lower stator sections are formed of electrically conductive material, the conductive blades can be in direct contact with stator sections 60, 64 and conductive strips 58 and 62 can be omitted. For clarity, a balanced circuit similar to the one shown in FIG. 15 of U.S. Pat. No. 7,834,513 is provided. A source 80 of positive voltage is connected to inductor 82 and resistor 84 and to conductive strip 58. A source 86 of negative voltage is connected to inductor 88 and resistor 90 and to conductive strip 62. Note that it is beneficial if the conducting strip 53 is a plating rather than a foil. Such plating can be formed by vapor deposition. In this embodiment, a connection is made from a node 85 between resister 84 and strip 58 to a node 91 between resistor 90 and strip 62. The connection from node 85 is made to a capacitor 94 and to a load 96 to a capacitor 98 to node 91. Based on the teachings herein, those skilled in the will understand that other circuits are useable with the configuration of FIG. 5.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   a cylindrical rotor having an axis of rotation and an outer surface; and a plurality of rotor electrodes attached to said outer surface, wherein each rotor electrode of said plurality of rotor electrodes has a width dimension and a length dimension, wherein said length dimension is longer than said width dimension and is oriented at an angle φ relative to said axis of rotation, wherein said rotor is formed of a material, wherein said angle $$\phi = \left(\frac{1}{2}\right)\cos^{-1}\left(\frac{1-\gamma}{1+\gamma}\right),$$

where γ is the Poisson Ratio of said material.

2. The apparatus of claim 1, wherein said material is a fiber-composite.

3. The apparatus of claim 1, wherein said each rotor electrode comprises an electrically conductive foil.

4. The apparatus of claim 3, wherein said foil comprises aluminum.

5. The apparatus of claim 1, wherein said each rotor electrode comprises a planar stack of thin metal wires, connected electrically to each other at one or both ends of the stack.

6. The apparatus of claim 3, wherein each said foil comprises rounded edges made by folding a small width of the foil back on itself with the folded edge section being at the back.

7. The apparatus of claim 6, further comprising two thin longitudinally oriented pieces of wire included in the folds to make more rounded edges.

8. The apparatus of claim 1, wherein said outer surface is non-conducting.

9. The apparatus of claim 1, further comprising a thin cover layer of fiber composite placed over said each electrode.

10. The apparatus of claim 1, wherein said each rotor electrode is attached with adhesive to said rotor surface.

11. The apparatus of claim 1, wherein said each rotor electrode is attached via a layered structure to said rotor surface, wherein said layered structure comprises a first adhesive layer attached to an elastomeric material attached to a second adhesive layer, wherein said first adhesive layer is attached to said rotor surface and said second adhesive layer is attached to said rotor electrode.

12. An apparatus, comprising:
a cylindrical rotor having an axis of rotation and an outer surface; and
a plurality of rotor electrodes attached to said outer surface, wherein each rotor electrode of said plurality of rotor electrodes has a longer dimension that is oriented at an angle φ relative to said axis of rotation, where the angle is selected to reduce the effects on said electrodes of geometric distortion produced as said rotor increases or decreases in rotational velocity compared to the case that would exist if said electrodes were aligned with said axis.

13. The apparatus of claim 12, wherein said rotor is formed of a material, wherein said angle $$\phi = \left(\frac{1}{2}\right)\cos^{-1}\left(\frac{1-\gamma}{1+\gamma}\right),$$

where γ is the Poisson Ratio of said material.

14. An apparatus, comprising:
a cylindrical rotor having an axis of rotation and an outer surface; and
a plurality, of rotor electrodes attached to said outer surface, wherein each rotor electrode of said plurality of rotor electrodes has a longer dimension that is oriented at an angle φ relative to said axis of rotation, where the angle is selected such that said rotor electrodes will experience reduced tension or compression effects, compared to the case that would exist if said rotor electrodes were aligned with said axis, as the rotor spins up or slows down.

15. The apparatus of claim 14, wherein said rotor is formed of a material, where said angle $$\phi = \left(\frac{1}{2}\right)\cos^{-1}\left(\frac{1-\gamma}{1+\gamma}\right),$$

where γ is the Poisson Ratio of said material.

16. An apparatus, comprising:
a cylindrical rotor having an axis of rotation and an outer surface; and
a plurality of rotor electrodes attached to said outer surface, wherein each rotor electrode of said plurality of rotor electrodes has a longer dimension that is oriented at an angle φ relative to said axis of rotation, where said angle φ is selected to reduce or eliminate any metal fatigue or loss of bonding that might have arisen if the electrodes were to be aligned with the axis.

17. The apparatus of claim 16, wherein said rotor is formed of a material, wherein said angle $$\phi = \left(\frac{1}{2}\right)\cos^{-1}\left(\frac{1-\gamma}{1+\gamma}\right),$$

where γ is the Poisson Ratio of said material.

18. An apparatus, comprising:
a cylindrical rotor having an axis of rotation and an outer surface; and
a plurality of rotor electrodes attached to said outer surface, wherein as the rotational velocity of said rotor increases, the rotor will contract axially and expand in circumferential length, where there exists on the surface of said rotor, helical lines for which there is neither expansion nor contraction is length, wherein said helical lines are located at an angle φ with respect to said axis of rotation, wherein said rotor electrodes are oriented with respect to the axis by said angle.

19. The apparatus of claim 18, wherein said rotor is formed of a material, wherein said angle $$\phi = \left(\frac{1}{2}\right)\cos^{-1}\left(\frac{1-\gamma}{1+\gamma}\right),$$

where γ is the Poisson Ratio of said material.

* * * * *